(12) United States Patent
Volpe et al.

(10) Patent No.: US 10,454,831 B1
(45) Date of Patent: Oct. 22, 2019

(54) LOAD-BALANCED FORWARDING OF NETWORK PACKETS GENERATED BY A NETWORKING DEVICE

(71) Applicant: Amazon Technologies, Inc., Seattle, WA (US)

(72) Inventors: Thomas A. Volpe, Austin, TX (US); Asif Kahn, Cedar Park, TX (US); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 140 days.

(21) Appl. No.: 15/199,501

(22) Filed: Jun. 30, 2016

(51) Int. Cl.
*H04L 12/803* (2013.01)
*H04L 12/743* (2013.01)

(52) U.S. Cl.
CPC ........ *H04L 47/125* (2013.01); *H04L 45/7453* (2013.01)

(58) Field of Classification Search
None
See application file for complete search history.

(56) References Cited

U.S. PATENT DOCUMENTS

| | | | | |
|---|---|---|---|---|
| 5,940,372 A | * | 8/1999 | Bertin | ..................... H04L 45/00 370/238 |
| 6,209,033 B1 | * | 3/2001 | Datta | ................. H04L 41/0813 370/232 |
| 6,564,145 B2 | * | 5/2003 | Kim | ...................... G01C 21/34 701/533 |
| 7,031,304 B1 | | 4/2006 | Arberg et al. | |
| 7,284,067 B2 | * | 10/2007 | Leigh | .................. H04L 67/1008 709/238 |
| 7,382,782 B1 | | 6/2008 | Ferguson et al. | |
| 7,738,385 B2 | | 6/2010 | Buduma et al. | |
| 7,764,621 B1 | | 7/2010 | Busch et al. | |
| 9,014,003 B2 | * | 4/2015 | Song | ................... H04L 49/9042 370/237 |
| 9,367,501 B2 | * | 6/2016 | Idziorek | ................ G06F 13/385 |
| 2001/0055274 A1 | | 12/2001 | Hegge et al. | |

(Continued)

OTHER PUBLICATIONS

U.S. Appl. No. 14/981,656, filed Dec. 28, 2015, Leonard Thomas Tracy, et al.

(Continued)

*Primary Examiner* — Donald L Mills
(74) *Attorney, Agent, or Firm* — Robert C. Kowert; Meyertons, Hood, Kivlin, Kowert & Goetzel, P.C.

(57) ABSTRACT

Forwarding of network packets generated by a networking device may be load-balanced. Network packets may be generated by a networking device, such as a packet processor, that also processes and forwards received network packets. Forwarding decisions for the generated network packets may be made according to a load balancing scheme among possible forwarding routes from the networking device. In at least some embodiments, a destination resolution pipeline for determining forwarding decisions for generated network packets may be implemented separate from a destination resolution pipeline for determining forwarding decisions for received network packets in order to determine different forwarding decisions for the generated network packets. The generated network packets may then be forwarded according to the determined forwarding decisions.

20 Claims, 9 Drawing Sheets

(56) References Cited

U.S. PATENT DOCUMENTS

| | | |
|---|---|---|
| 2006/0176880 A1 | 8/2006 | Bare et al. |
| 2006/0209688 A1* | 9/2006 | Tsuge ............... H04L 67/1008 370/229 |
| 2010/0284271 A1* | 11/2010 | Ferguson ............ H04L 45/60 370/230 |

OTHER PUBLICATIONS

U.S. Appl. No. 14/981,672, filed Dec. 28, 2015, Thomas A. Volpe, et al.

* cited by examiner

LOAD-BALANCED FORWARDING OF NETWORK PACKETS GENERATED BY A NETWORKING DEVICE

BACKGROUND

Network communications are foundational to the operation of many different systems and devices. Large public networks, such as the Internet, or smaller private networks, such as corporate intranets, facilitate communications between different systems or devices, from clients of services that provide storage, computing, or data delivery to hosting internal web sites or network tools accessible to a small number of users. Such networks utilize large numbers of networking devices to facilitate the fast and reliable delivery of data, network packets, from one system to another.

Leveraging the power of network communications has greatly increased the demand upon networking devices to receive, process, and send network packets. In turn, this increased demand has led to a greater need to evaluate the performance of networking devices. Diagnostic and other types of information gathered to evaluate the performance of networking devices may be sent on to other locations for evaluation. However, sending the evaluative information of networking device performance is not without cost. Powering devices to handle high workloads at great speed, for example, may be subject to various physical limitations, such as heat generated by power intensive networking devices, so that without certain power budgets or other limitations, networking devices may be unable to handle the workloads sustainably. Other limitations, such as diagnostic traffic being sent to another location for evaluation, may limit available bandwidth for received traffic or may cause congestion on particular ports at the networking device or paths from the networking device (e.g., congestion at subsequent networking devices). Therefore, techniques that provide efficient utilization of networking device resources without sacrificing performance may be desirable.

Figure 1:
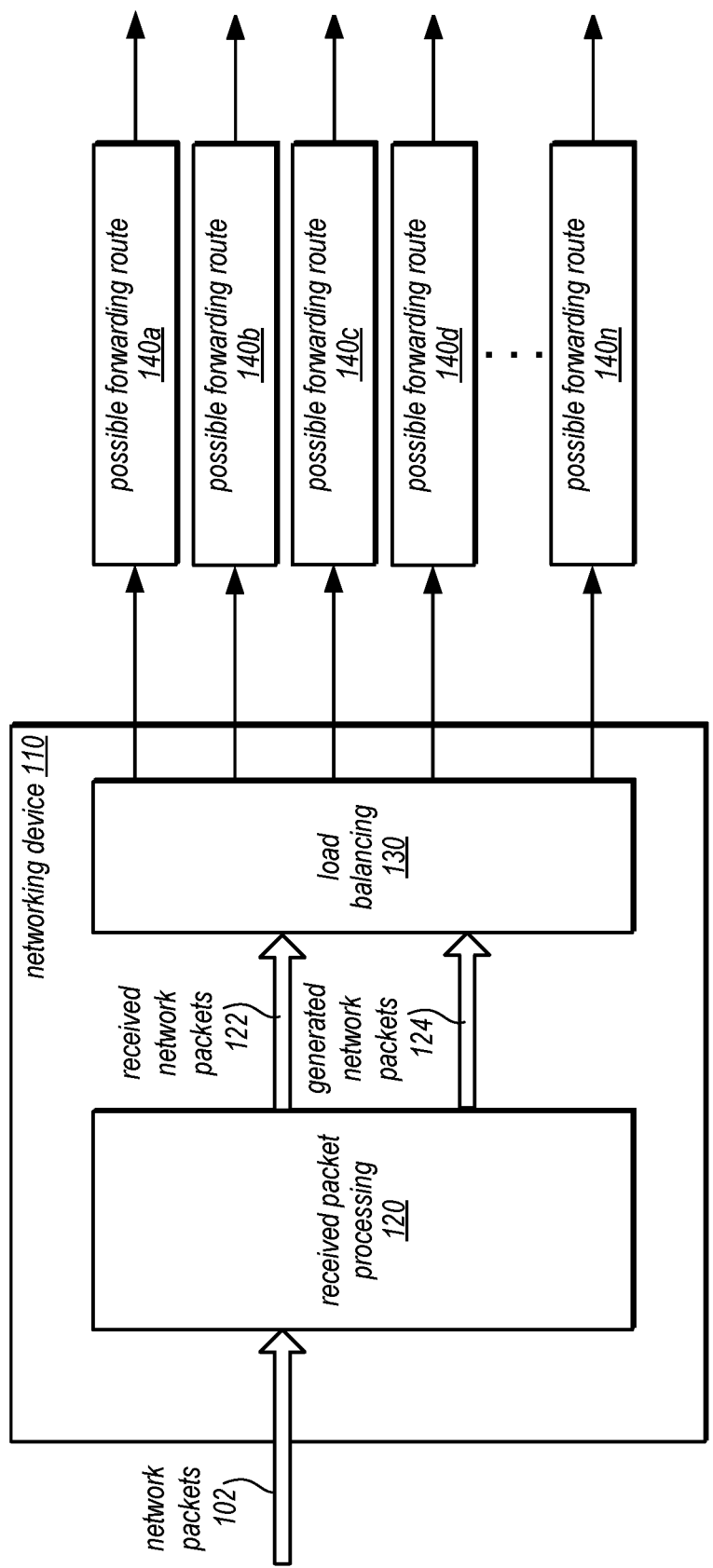
FIG. 1 illustrates a logical block diagram of load-balanced forwarding of network packets generated by a networking device, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement load-balanced forwarding of network packets by a networking device. Network packets are packets of data (e.g., datagrams) sent across a network from a source networking device (e.g., a network interface card implemented at a computer or server) to a destination networking device. The network may include many other networking devices, such as various kinds of switches, routers, network bricks, or any other device capable of receiving, processing, and/or sending the network packets across links between the networking devices in the network.

The path or route which a network packet travels may be determined according to forwarding decisions made at various networking devices in a network. A switch, for instance, may receive a network packet and make forwarding decisions with respect to the content of information in the network packet, such as various packet header fields. Consider a network packet that includes a destination address formatted in accordance with Internet Protocol (IP). A forwarding route may be an address or portion of an address which if matching the destination address for the network packet, identifies forwarding decision(s) to be made with respect to the network packet, such as a next hop address. Once a forwarding decision is made, modifications to the packet may be performed, and the packet sent to a next networking device connected to the current networking device (or the networking packet may be dropped). Forwarding of the network packet may continue amongst the networking devices of a network until the network packet reaches the desired destination.

Forwarding decisions may be determined in one or more stages, such as destination resolution stages. Different lookup operations to determine actions to be performed with respect to a network packet may be identified for a network packet by reading different entries in different lookup tables associated with the destination resolution stages. For example, a destination resolution stage may be used to obtain information to initiate tunneling for a network packet, provide multipath lookups, obtain labels to add to a packet for multiprotocol label switching, determine a next hop address, perform fast re-route, or implement link aggregation.

In addition to processing network packets received at a networking device, networking devices may generate additional network packets and process and forward them accordingly. Generated network packets may include mirrored versions of network packets (e.g., encapsulated remote spanned (ERSPAN) packets sent via user datagram protocol (UDP) or generic route encapsulation (GRE)), sample packets from one or more different network flows (e.g., sFlow, NetFlow, or internet protocol flow information export (IPFIX) packets), statistical data (e.g., network traffic information), or any other network packet generated by or originating from the networking device (e.g., which may be network packets generated by a packet processor instead of network packets received at the packet processor for processing from a remote packet processor or networking device or host computing device, such as general processor(s) 230 in FIG. 2). Generated network packets may be processed and/or forwarded similar to received network packets, as discussed above.

Because generated network packets create additional load for packet processing stages or components and network interfaces at a networking device, as well as other networking devices which may also receive the generated network packets forwarded by the networking device, overall processing capacity for network packets at the networking device (and subsequent networking devices) may become strained. For example, some network packets may be identified for mirroring to a different system for analysis. As it is desirable for network packets in the same traffic or packet flow originating from the same source to a same destination to travel the same forwarding route among networking devices, typically mirrored versions of network packets may be forwarding according to the same forwarding route, which may, for instance, greatly increase the traffic on a particular port selected for forwarding mirrored traffic from the traffic flow. By load-balancing the forwarding of generated network packets across possible forwarding routes, the capacity of the networking device to generate and send additional network packets for diagnostic and other evaluative purposes may increase without negatively impacting the processing of received network packets. Higher sampling or reporting rates for a networking device may be implemented, in some instances, where the forwarding of generated network packets is balanced.

FIG. 1 illustrates a logical block diagram of load-balanced forwarding of network packets generated by a networking device, according to some embodiments. Networking device 110 may be a networking device configured to route, forward, or otherwise facilitate the communication of different devices, systems or networks via network connections to the networking device, such as discussed below with regard to FIG. 2. Network packets 102 may be received at networking device 110 for processing and forwarding with respective forwarding decisions made for the network packets by received packet processing 120. For instance, received packet processing may implement various processing stages and components like those of a packet processor discussed below with regard to FIG. 3. As part of processing received network packets 122, load balancing 130 may be implemented to distribute the forwarding of received network packets among possible forwarding routes 140.

Figure 4:
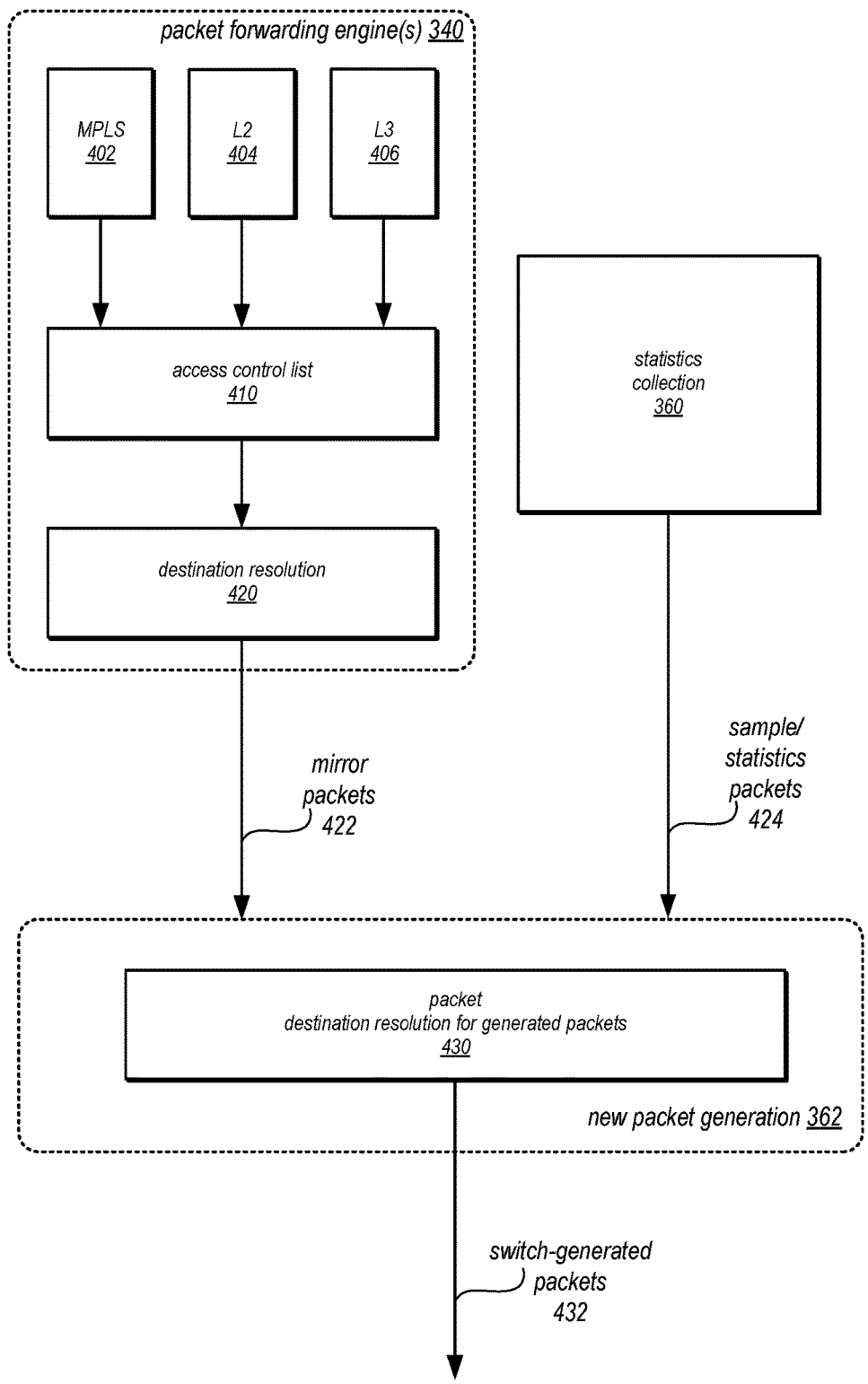
FIG. 4 is a logical block diagram illustrating separate destination resolution pipelines for processing received network packets and network packets generated by the packet processor, according to some embodiments.
Figure 8:
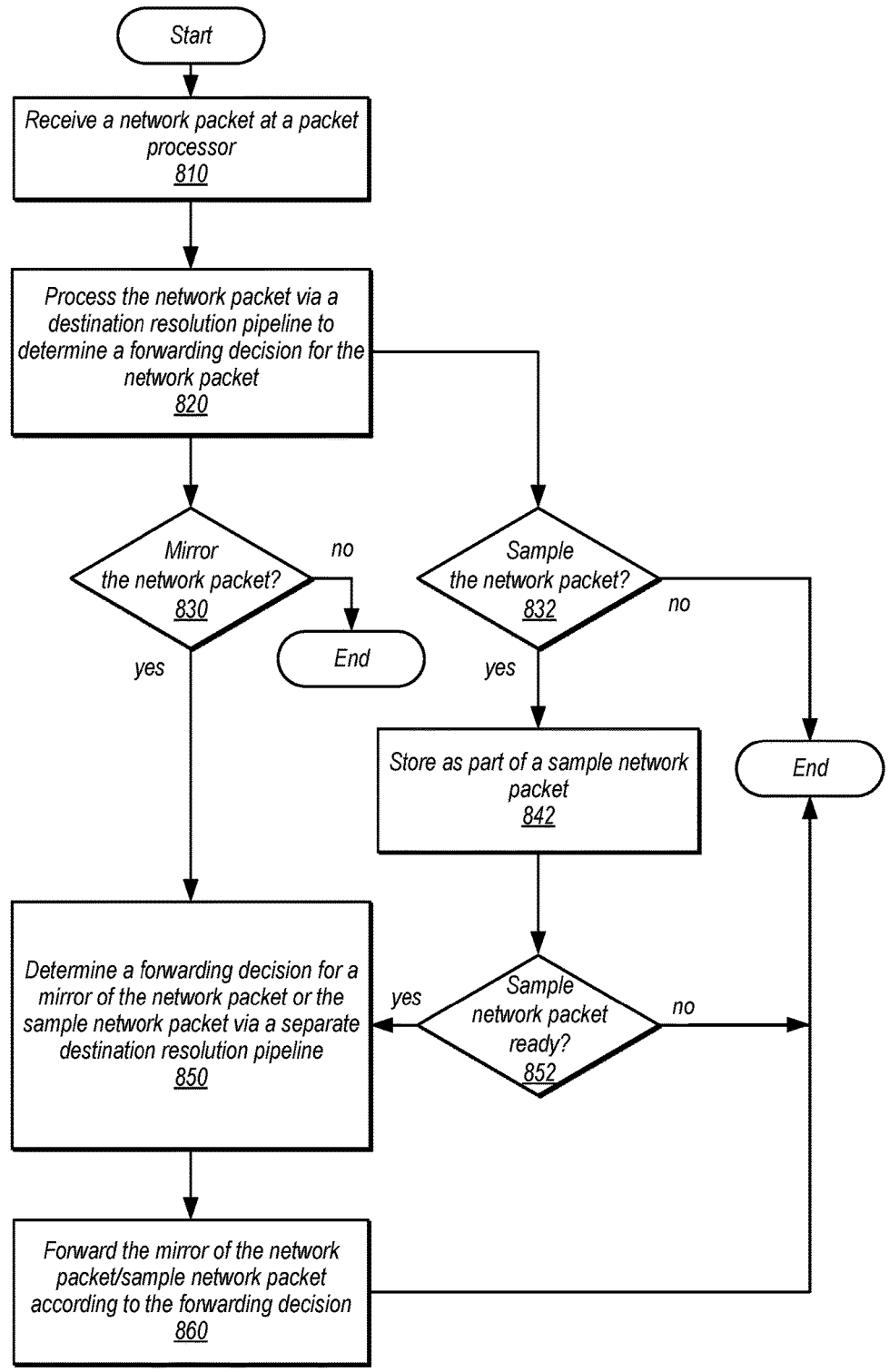
FIG. 8 is a high-level flowchart illustrating various methods and techniques to process mirrored packets and sampled packets via a separate destination resolution pipeline, according to some embodiments.
Figure 9:
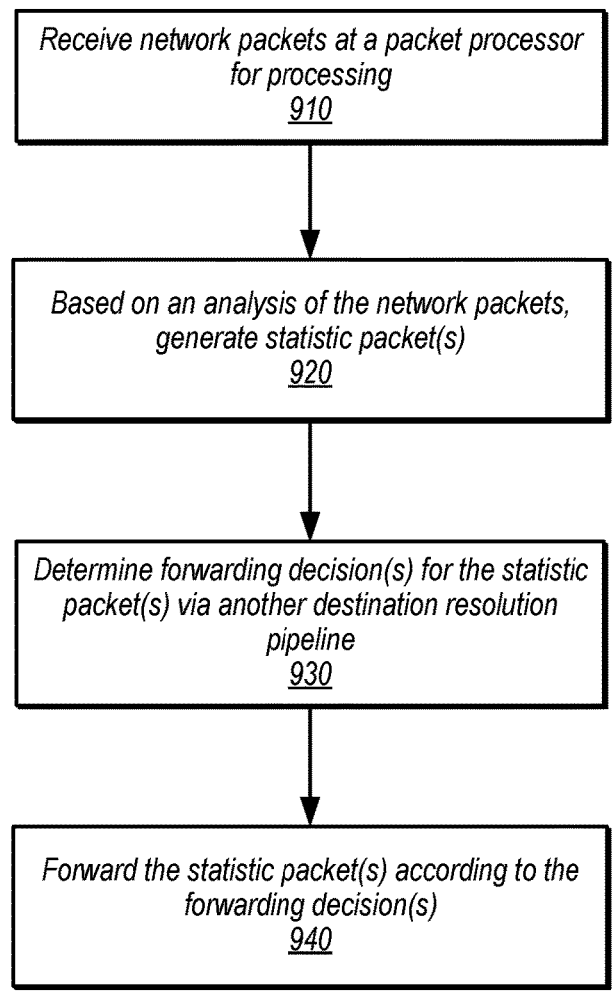
FIG. 9 is a high-level flowchart illustrating various methods and techniques to process statistic packets via a separate destination resolution pipeline, according to some embodiments.

In addition to load balancing received network packets 122, networking device 110 may also implement load balancing 130 for generated network packets 124 to distribute the forwarding of received network packets among possible forwarding routes 140. Load balancing 130 may implement various load-balancing schemes, such as different randomization techniques. A hashing technique, such as described below with respect to FIGS. 5 and 6, for example may be applied to data value(s) of network packets (e.g., header fields) to determine the forwarding routes. At least some of these schemes may be implemented in such a way as to ensure that received network packets 122 of a same traffic flow are forwarding via the same forwarding route 140, whereas for generated network packets 124, load balancing 130 may spray mirrored versions of network packets from the same traffic flow across multiple ones of forwarding routes 140. For example, as illustrated in FIGS. 4, 8 and 9, separate destination resolution stages may be implemented to perform load balancing for received network packets 122 and generated network packets 124, in some embodiments, so that the load balancing techniques may be different depending on whether the network packet was generated at networking device 110. Furthermore, by utilizing separate destination resolution stages for generated network packets, processing bandwidth in the packet processing pipeline for received network packets may be reserved for received network packets.

This specification begins with a general description of a networking device, which may implement load-balancing for network packets generated by a packet processor implemented as part of the networking device. Then various examples of a packet processor are discussed, including different components/modules, or arrangements of components/modules that may be implemented and which may generate network packets and load balance the generated network packets amongst possible forwarding routes. A number of different methods and techniques to implement load-balanced forwarding of network packets generated by a networking device are then discussed, some of which are illustrated in accompanying flowcharts. Various examples are provided throughout the specification.

Figure 2:
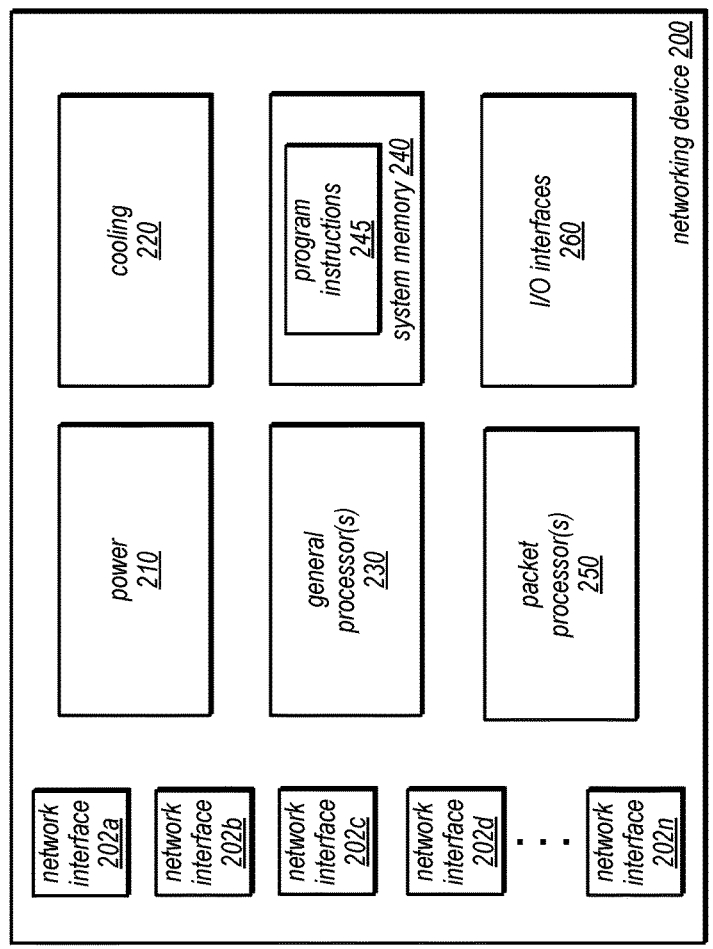
FIG. 2 is a logical block diagram illustrating a networking device that implements a packet processor, according to some embodiments.

FIG. 2 is a logical block diagram illustrating a networking device that implements a packet processor, according to some embodiments. Networking device 200 may be a networking device configured to route, forward, or otherwise facilitate the communication of different devices, systems or networks via network connections to the networking device. A networking device may provide electrical and logical network connections. Networking devices may operate utilizing data included in different OSI layers, such as layers 2 and 3 to make forwarding determinations (e.g., to send a network packet received from one source connected to the switch to another source connected to the switch). Please note that networking devices, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of networking device 200.

Networking device 200 may include general processor(s) 230 which may include multiple cores (and which may be single or multi-threaded) coupled to a system memory 240 via an input/output (I/O) interface 260. Networking device 200 may be a uniprocessor system including one processor 230, or a multiprocessor system including several processors 230 (e.g., two, four, eight, or another suitable number).

General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement various management functions and interfaces for networking device 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. Program instructions 245 may also implement a controller that is configured to interface with packet processor(s) 250. For example, a controller may be configured to program memory devices with new or additional information (e.g., update next hop tables, pointer tables, action tables, insert or remove forwarding routes, etc.). For example, a controller may be configured to program the hash schemes that generate hash keys to locate entries in pointer tables (e.g., by specifying different fields for in a packet header), as well as distribution schemes for mapping hash values to a group of entries in a pointer tables. A controller may, in some embodiments, be configured to change the pointers and pointer type values associated with particular entries (e.g., in accordance with a change in a forwarding route) in order to reconfigure the processing of different packets at destination resolution stages in a packet processor. A controller may also perform various statistical analysis or evaluations to be sent as statistic or other forms of network packets generated by packet processors 250.

A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g., SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to perform various switch management operations). In one embodiment, I/O interfaces 260 may be configured to coordinate I/O traffic between processor 230, system memory 245, packet processor(s) 250, and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

Figure 3:
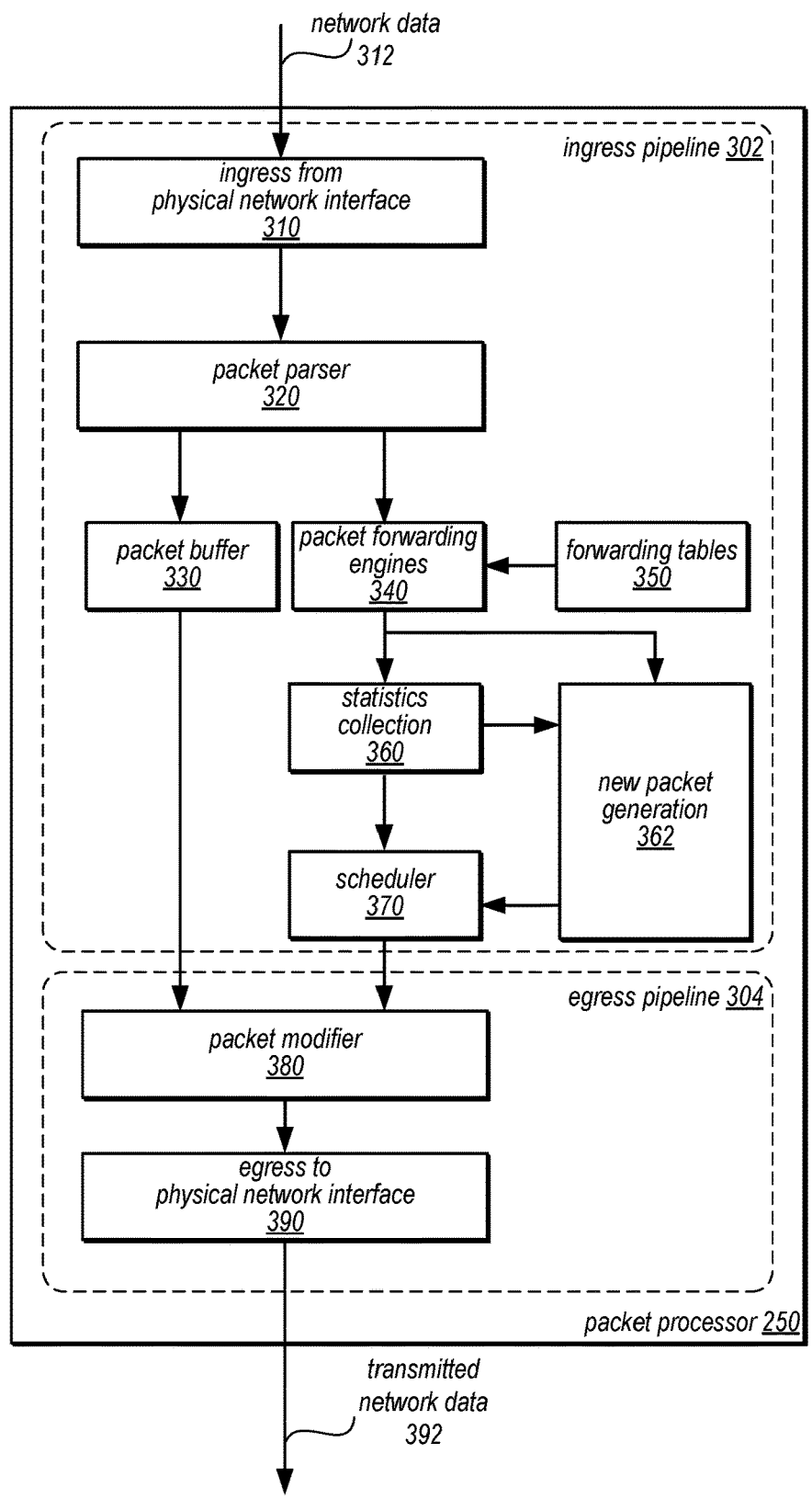
FIG. 3 is a logical block diagram illustrating a packet processor that implements load-balanced forwarding of network packets generated by the packet processor, according to some embodiments.

As noted in FIG. 2, one or multiple packet processors 250 may be implemented to process data received via network interface(s) 202 at networking device 200. Packet processor(s) 250 may be implemented as dedicated hardware to perform various stages of packet processing for networking device 200. For example, packet processor(s) 250 may be implemented as an application specific integrated circuit (ASIC), field programmable gate array (FPGA), system-on-a-chip (SoC), or other dedicated circuitry that performs packet processing. Packet processor(s) 250 may also be implemented as a software-based packet processing pipeline to perform various stages of packet processing for networking device 200 (e.g., via program instructions executing on one or more general processors 230). Packet processor(s) 250 may be assigned to one or multiple network interface(s) 202, performing dedicated processing of network data received via the assigned network interface(s) 202. FIG. 3 is a logical block diagram illustrating a packet processor that implements load-balanced forwarding of network packets generated by the packet processor, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350.

Ingress pipeline 302 may also access packet tables 350 and other packet routing information. Egress pipeline 304 may include a packet modifier 370 with access to other packet modification data, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different layer headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340. In some embodiments, packet parser 320 may determine different hash key values to determine an entry in pointer tables in different destination resolution stages (e.g., a tunnel initiation stage, multipath stage 510 in FIG. 5, or link aggregation stage 530 in FIG. 5) from various packet header fields (e.g., fields from layers 1, 2, 3, and 4 of the network packet and bits from the UDF) either for received network packets or network packets generated by packet processor 250, in some embodiments. Hash key values generated for a network packet can be generated for a specific type of network packet (e.g., IP or MPLS) and may be generated according to one of many different hash functions (e.g., CRC16-CITT and CRC16-IBM).

Packet forwarding engines 340 may access data stored in packet tables 350 to make forwarding and tunneling decisions for the network packet based on information in the packet header (e.g., including source and destination addresses) extracted by packet parser 320. For example, packet forwarding engines 340 may perform lookups for data in layer 2 (L2) portions of the packet to perform L2 forwarding. Similarly, packet forwarding engines 340 may also perform lookups for data in layer 3 (L3) portions of the packet to perform L3 forwarding, in some embodiments. For example, internet protocol (IP) headers for the packet may be evaluated with respect to entries in tables, such as a routing or next hop table, to determine forwarding to be performed. In at least some embodiments, packet forwarding engines 340 may implement one or more destination resolutions stages (e.g., as part of a destination resolution pipeline, such as destination resolution pipeline 420 in FIG. 4 below) to determine forwarding decisions for network packets. For example, various destination resolution stages may include such as a tunnel initiation stage, multipath stage, multiprotocol label switching (MPLS) outer label stage, next hop address stage, fast re-route stage, and link aggregation stage. As packet forwarding engines 340 make forwarding decisions about the packet (e.g., for L2, L3 and/or tunneling), the decisions are maintained as packet metadata. The packet metadata may be provided to scheduler 370 for scheduling determinations. Packet forwarding engines 340 may provide indications to new packet generation 362 to indicate which network data packets are to be mirrored.

As discussed above, packet tables 350 may be implemented in one or multiple storage devices, such as various memory devices (e.g., a CAM, such as a TCAM, and/or random access memory, such as SRAM) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

In at least some embodiments, ingress pipeline 302 may implement statistics collection 360. Statistics collection 360 may collect statistics based on the network packets processed through ingress pipeline 302. For example, various counters may be maintained for events occurring during processing by packet forwarding engines 340 (e.g., such as forwarding table 350 hits including VLAN table, MAC address table, routing table, adjacency table, next hop table, tunnel start table, tunnel termination table, and/or actions table). Statistics collection 360 may also collect statistics and information concerning traffic flow and network visibility through packet processor 250, for example, by detecting, measuring, and exporting flow cache entries for large traffic flows, by sampling, aggregating, and exporting snippets (e.g., 128 bytes) from network packets from small traffic flows, and/or determining the number of unique traffic flows. In at least some embodiments, statistics collection 360 may provide statistic packets (or information to generate statistics packets that encapsulate some of the collected statistics) to new packet generation 362 to generate and forward as network packets generated by packet processor 250, as discussed below with regard to FIG. 4.

Scheduler 370 may control the buffering of packets and scheduling of operations within packet processor 250. For example, scheduler 370 may implement a memory management unit to allocate available memory segments in packet buffer 330 to store packets to be buffered. If a packet needs to be buffered (e.g., because the egress interface is congested), scheduler 370 may store the packet in a private pool of memory assigned to a particular physical interface port for the packet or shared pools of memory to store packets (e.g., if the private pool of memory is full). Scheduler 370 may also implement a memory management unit to dequeue packets from packet buffer 330 for final processing and egress. Scheduler 370 may provide the appropriate metadata for a packet to modifier 360. Although not illustrated in FIG. 3, packets from packet buffer 330 and packet metadata from scheduler 370 may be moved from ingress pipeline 302 to egress pipeline 304 via a crossbar. A crossbar may, for example, be implemented by one or more destination rings to transmit a network packet from the ingress pipeline 302 via egress pipeline 304 to a desired destination port. Scheduler 370 may also schedule the egress of network packets generated by new packet generation 362 (e.g., statistics network packets collected by statistics collection 360 or mirrored/sampled versions of network packets identified by forwarding engines 340).

Network packets that have passed through ingress pipeline 302 may be scheduled or released from packet buffer 330 for modification, reassembly and egress as part of egress pipeline 304. Packet modifier 380 may be implemented to modify packet headers based on the routing decisions indicated in the packet metadata determined by packet forwarding engines 340. For example, if tunneling is enabled for a packet, packet modifier 380 may create and insert the appropriate tunnel header in order to encapsulate at least a portion of the packet to implement a tunneling protocol. Packet modifier 380 may also perform modifications to other data in the packet header. Once the modified packet has been reassembled, egress unit to physical network interface 390 may utilize the physical layer (PHY) interface and the Ethernet Media Access Control (MAC) layer interface to transmit network packets as network data 392 via the appropriate physical connection (e.g., coaxial, twisted pair, or optical cable).

FIG. 4 is a logical block diagram illustrating separate destination resolution pipelines for processing received network packets and network packets generated by the packet processor, according to some embodiments. As noted above, network packets received at a packet processor for processing may be processed via different forwarding engines. While being processed at packet forwarding engine(s) 340, different stages may identify a network packet for mirroring. For example, in FIG. 4 MPLS stage 402 may perform a label lookup for an MPLS packet to determine a forwarding action. Forwarding actions may include actions indicating that the network packet is to be mirrored. Similarly, L2 stage 404 may perform a lookup for L2 packets based on destination MAC address to determine a forwarding action. Forwarding actions may include actions indicating that the network packet is to be mirrored. Likewise L3 stage 406 may perform a lookup in a routing table for L3 network packets, based on IP network addresses to determine a forwarding action. As with MPLS stage 402, and L2 stage 404, forwarding actions may include actions indicating that the network packet is to be mirrored. Another stage that may identify network packets for mirroring may be access control list stage 410 (which may be used to process different types of network packets, including MPLS, L2, and L3 network packets). Access control list stage 410 may apply various forwarding rules to network packets, including rules that identify some network packets for mirroring. Destination resolution stage 420 may also include various stages that may make determinations including whether a network packet is to be mirrored.

Indications of network packets to be mirrored 422 may be provided to new packet generation 362. Likewise, statistics collection 360 may provide sample and statistics network packets 424 to new packet generation 362. New packet generation 362 may perform various operations to generate and/or prepare network packets generated at packet processor 250, such as replication and encapsulation of mirrored network packets, aggregation and encapsulation of sampled network packets, and encapsulation of statistics information. For example, network packet generation 362 may implement various control status registers which describe how different mirrored network packets are to be encapsulated, how sampled network packets are to be aggregated and encapsulated, and/or how statistics packets are to be encapsulated, including information describing encapsulation type (e.g., UDP or GRE encapsulation), destination type (e.g., selecting a destination resolution stage to process the packet), destination pointer (e.g., identifying an entry in a table of the selected destination resolution stage), whether or not the packet is to be a snippet, and/or other information for generating the network packet. In at least some embodiments, new packet generation 362 may implement techniques to load balance the distribution of the network packets generated by new packet generation 362 across multiple possible forwarding routes from packet processor 250. For example, new packet generation 362 may implement processor-generated packet destination resolution pipeline 430 to determine forwarding decisions for generated network packets (e.g., mirror packets 422 or sample/statistics packets 424).

Figure 5:
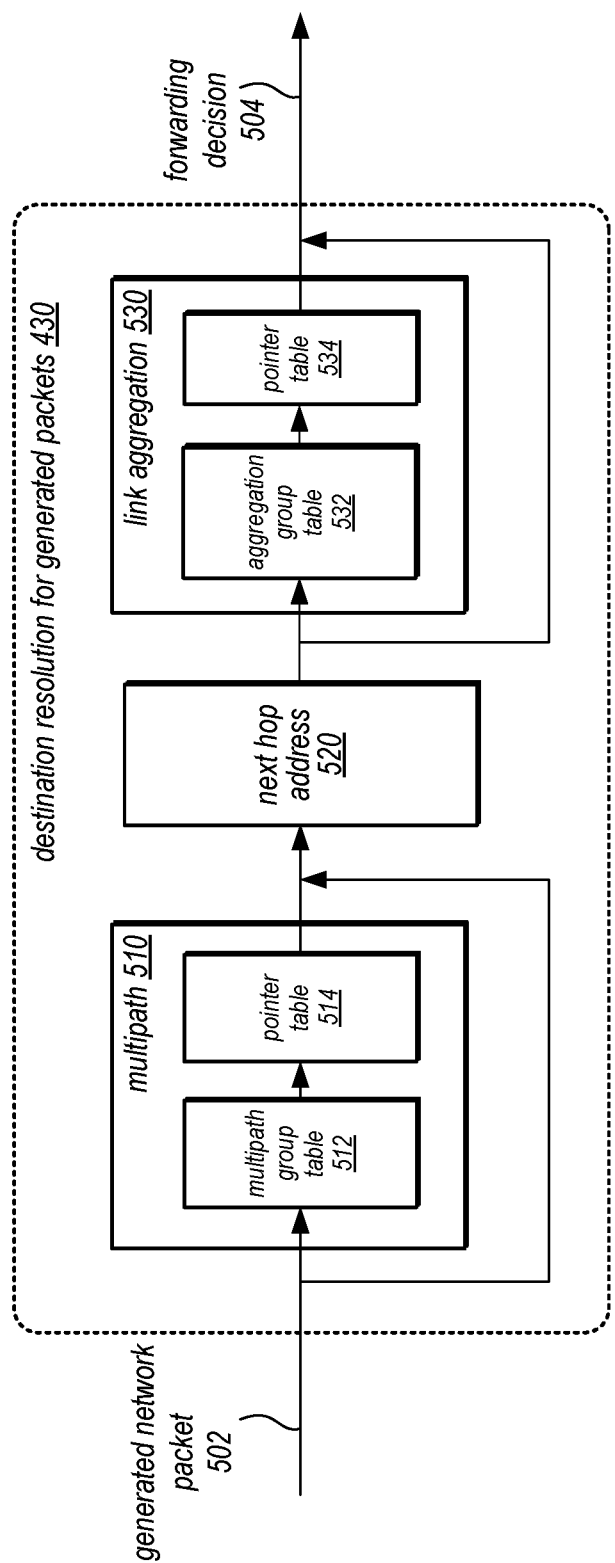
FIG. 5 is a logical block diagram illustrating a processor-generated packet destination resolution pipeline, according to some embodiments.

FIG. 5 is a logical block diagram illustrating a processor-generated packet destination resolution pipeline, according to some embodiments. Processor-generated packet destination resolution pipeline 440 may implement multiple different destination resolution stages, such as multipath stage 510, next hop address stage 440, fast re-route stage 520, and link aggregation stage 530. When a generated network packet 502 is received, different destination resolution stages may be selected based on accessing an entry in a pointer table at prior stages (either in destination resolution pipeline for generated packets 440 (e.g., an entry in next hop address table 520 may select whether or not to apply link aggregation stage 530) or at a prior stage in packet processing pipeline 302 (e.g., MPLS stage 402, L2 stage 404, L3 stage 406, access control list stage 410, stages of destination resolution 420, etc., in FIG. 4)). The type of the pointer located in the accessed entry may indicate the destination resolution stage in destination resolution pipeline for generated packets 430 to apply to a generated network packet (e.g., a multipath pointer type may indicate that multipath stage 510 may be applied, a next hop address pointer type may indicate the application of next hop address stage 520, or a link aggregation pointer type may indicate that link aggregation stage 530 is to be applied). A lookup operation using the pointer may be performed at the selected stage (e.g., in a group table, such as multipath group table 512 or aggregation group table 532) or a pointer table, such as next hop address 520). Once the selected destination resolution stages are complete, forwarding decision 504 may be included in network packet metadata so that subsequent stages, such as Scheduler 370, packet modifier 370, and egress to physical network interface 390 can forward the generated network packet according to the forwarding decision 404.

In at least some embodiments, processor-generated packet destination resolution pipeline 440 may implement multipath stage 510. Multipath stage 510 may provide weighted cost multipath (WCMP) to distribute network traffic amongst multiple valid paths in a network as part of a load-balancing mechanism for processor generated network packets. Paths may be selected based on a hash of data in the generated network packet for the generated network packet. For example, the hash values may be determined by applying a hash function to a field in taken from header data in a generated network packet (e.g., an L4 field such as source UDP) in some embodiments or a, the data in the network packet for the network packet may be modified so that the results of the applied hash functions are changed. For example, if the generated packet is a UDP network packet, the source UDP in the network packet may be modified (e.g., sprayed or otherwise randomized) and then a hash function applied. Such randomization may occur for all network packets generated by the packet processor with a source UDP (e.g., mirrored versions of network packets) so that the hash values generated for the network packets are different. In this way, the different hash values may be used to load balance forwarding of the generated packets with a same original source UDP (e.g., mirrored network packets from the same traffic flow). Moreover, by modifying the source UDP, which is part of the data in the network packet, future forwarding decisions for the network packets made at other packet processors may not be forwarded utilizing the same forwarding route, preventing downstream congestion at networking devices on any one particular forwarding path for generated network packets that originally had the same source UDP.

Figure 6:
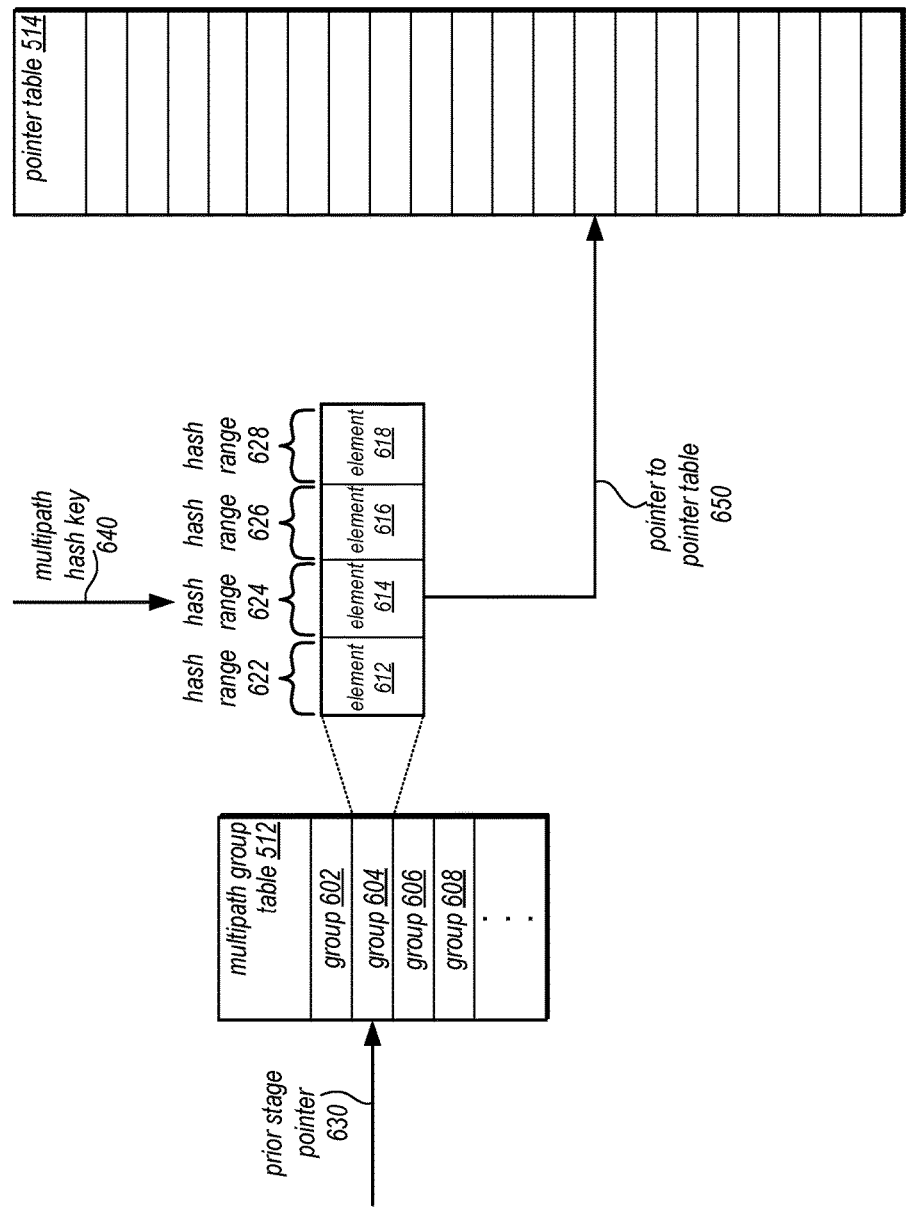
FIG. 6 is a data flow diagram illustrating a multipath group table and pointer table implementing a load balancing scheme, according to some embodiments.

Multipath stage 510 may implement multipath group table 512 and pointer table 514. A prior stage, such as an L2, L3, or ingress access control list forwarding engine may retrieve a pointer that has multipath pointer type. The multipath pointer type may indicate that the pointer is a pointer into multipath group table 512. While some destination resolution stages may implement single pointer table (e.g., next hop address stage 520 or other versions of multipath stage 510 or link aggregation stage 530 not illustrated which do not implement group tables) other destination resolution stages may utilize a group table and a pointer table in order to manage the distribution of selecting entries in the pointer tables. For example, groups within a group table may include different elements which may together map to an entry in a pointer table. FIG. 6 is a data flow diagram illustrating a multipath group table and pointer table implementing a load balancing scheme, according to some embodiments.

Multipath group table 512 may be composed of different groups, such as groups 602, 604, 606, 608, and so on. Each group has associated group includes different elements. For example, group 604 is illustrated as including elements 612, 614, 616, and 618. Hash ranges may be assigned to the different elements of a group, such as hash range 622 assigned to element 612, hash range 624 assigned to element 614, hash range 626 assigned to element 616, and hash range 628 assigned to element 618. The assignment of hash ranges to different elements for a group may be programmed or reprogrammed by a controller or other component that may access memory maintaining multipath group table 512. For example larger numbers of network packets may be directed to a pointer entry in pointer table 514 by assigning a greater hash value range to a particular member that maps to the particular pointer. In this way, traffic may be distributed across members in a group (and thus pointers in a pointer table) according to an equal cost (e.g., equal hash ranges) or weighted cost distribution scheme (e.g., different size hash ranges), in some embodiments. For example, different amounts of network traffic may be allocated to different paths by directing traffic to different elements that point to multipath pointers which describe different paths (e.g., 20% traffic directed to a particular pointer table pointer may be implemented by assigning 20% of the total hash space to element 612, 40% traffic may be directed to a second pointer mapped to element 614 by setting a hash range equivalent to 40% of the hash space, 26% of traffic may be directed to a third pointer mapped to element 616 equivalent to 26% of the hash space, and 16% of traffic directed to a fourth pointer mapped to element 618 which may be 16% of the hash space).

Table groups may be identified by the prior stage pointer 630, which points to one of the groups (e.g., group 604). Group 604 entry points in turn to the group entries 614 for the identified group. To select from among the multiple elements, a hash key value 640 is utilized. The hash key value may 640 be a hash value generated by parser 320 or some other packet processing stage prior to multipath stage 510 based on one or multiple different fields accessed in the network packet in the network packet. As noted above, in some embodiments, the data of the network packet may be randomized or otherwise modified prior to the application of the hash function. The hash key value 640 may fall within a range assigned to one of the elements (e.g., hash range 614 assigned to element 614). A pointer to multipath pointer table 514 may be determined by element 614 and group 604 in order to read the identified pointer.

Turning back to FIG. 5, once the appropriate entry for pointer table 514 in multipath stage 510 is identified, the contents of the entry may be read and evaluated. An entry in pointer table 514 may include the information that identifies the path along which to forward the generated network packet, a pointer to another destination resolution stage, and/or a pointer type for the pointer. For example, the entry may include a pointer identified as a next hop address pointer so that the next destination resolution stage to process the network packet is next hop address stage 520.

Processor-generated packet destination resolution pipeline 440 may implement next hop address stage 520, in some embodiments. Next hop address stage 520 may provide entries describing a next hop address (which may be a directly connected host to the networking device or an indirectly connected subnet) for different network packets corresponding to various forwarding routes (e.g., as may be pointed to by an L3 or MPLS forwarding engine or by an access control list rule) or other destination resolution stage (e.g., multipath stage 510). If a pointer does not point to a valid entry in next hop address stage 510, then the network packet may be trapped, forwarded, or logged for the controller to process. Entries in next hop address stage 510 may include an indication as to whether the entry is valid, an entry for address resolution protocol (ARP), a destination MAC address index, an indication as to whether an egress virtual local area network (VLAN) is valid, an egress VLAN, an egress logical port indication, and an indication of the maximum transmission unit (MTU).

Processor-generated packet destination resolution pipeline 440 may implement link aggregation stage 530, in some embodiments. Link aggregation stage 530 may enable sharing of bandwidth across multiple ports. To enable this feature, link aggregation stage 530 is implemented much like multipath stage 510 utilizing aggregation group table 532 to select group entries in pointer table 534. A particular group entry in 532 may be determined according to a hash value generated for link aggregation stage 530, which may be different than the hash key values generated for multipath stage 510. In some embodiments, link aggregation stage 530 provides an even distribution of traffic across group entries for a group in pointer table 534. However, weighted distribution is possible and may be programmed by the controller.

The examples of forwarding load-balanced network packets generated by a networking device as discussed above with regard to FIGS. 2-6 have been given in regard to a packet processor implemented as part of a networking device. Note that various other types or configurations of networking devices that implement packet processors or devices with packet processing pipelines may implement these techniques. Moreover, different configurations of the various modules, components, or stages within a packet processor may implement load balancing schemes and/or destination resolution stages for forwarding network packets. In addition to examples given above, the techniques discussed below with regard to FIGS. 7-9 may be also implemented using the various components discussed above as well as different types of systems or devices that perform packet processing.

Figure 7:
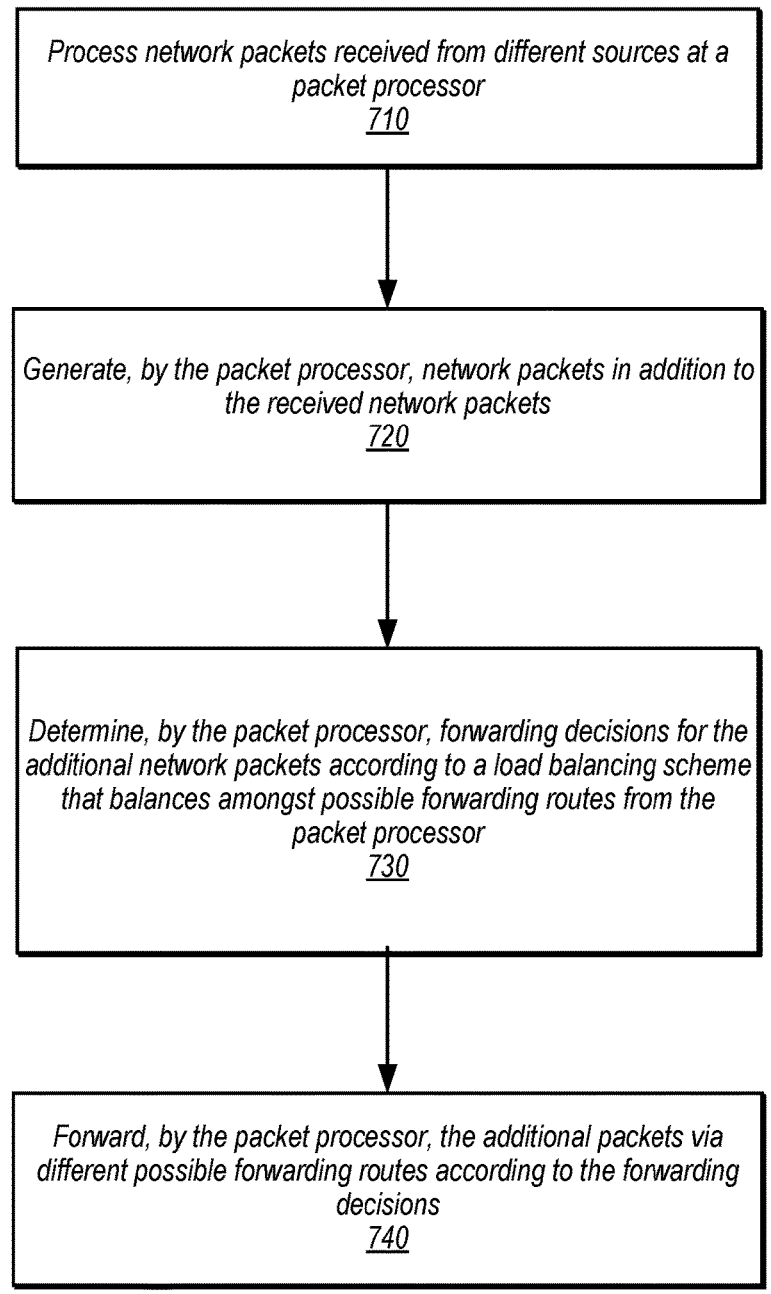
FIG. 7 is a high-level flowchart illustrating various methods and techniques to implement load-balanced forwarding of network packets generated by a packet processor, according to some embodiments.

FIG. 7 is a high-level flowchart illustrating various methods and techniques to implement load-balanced forwarding of network packets generated by a packet processor, according to some embodiments. Network packets may be a discrete portion of the stream of data transmitted over various types of network connections, such as twisted pair connections, coaxial connections, or fiber optic connections, or other wired or wireless connections formatted according to various transmission protocols. In at least some embodiments, network packets may be a unit of data according to layer 3, the network layer, of the open systems interconnection (OSI) model for communications. Layer 3 protocols may include protocols such as IP, internet control message protocol (ICMP), IP security (IPsec), routing information protocol (RIP), and many others. Note that different packet modifications, however, may be inserted to encapsulate data at differing levels of the OSI model, such as layer 2, layer 2.5, layer 3, and layer 4. In some embodiments, other types of packets such as L2 packets or MPLS packets may be received.

Network packets may be received at a packet processor from different sources. For example, a packet processor may include multiple different network interfaces or ports via which network packets from different networking devices connected to the packet processor via the network interfaces may be received. The received network packets may then be processed at the packet processor, as indicated at 710. For example, as discussed above with regard to FIG. 3, different packet processing stages may be performed in order to forward a received network packet. For instance, an ingress pipeline may include a packet parser to separate the payload of the network packet from packet header. Different forwarding engines, such as an L2, L3, and/or MPLS forwarding engine may evaluate information about the network packet (e.g., MAC address, destination address, or labels) to determine a forwarding route for the packet, or whether to forward the packet to the controller for further processing or drop the packet.

As a result of processing the received network packets, additional network packets may be generated by the packet processor, as indicated at 720, in some embodiments. For example, some received network packets may be identified for mirroring to a remote system or device that analyzes the network packet (along with other mirrored network packets). A mirrored version of the received network packets may thus be generated. In another example, samples of the network packets may be collected and/or aggregated and sent to a remote system or device that analyzes the sampled version of the network packet. Another form of generated network packet, in some embodiments, may be network packets that convey statistical or diagnostic information about the performance of the packet processor which may also be sent to a remote system or device that analyzes the statistical or diagnostic information. Note, however, that the techniques described below with respect to elements 730 and 740 may be performed for any type of network packet generated by the packet processor in addition to received network packets without regard to the cause of the network packet's generation.

As indicated at 730, they packet processor may determine forwarding decisions for the additional network packets according to a load balancing scheme that balances among possible forwarding routes from the packet processor. For example, various types of randomization techniques (e.g., randomly selecting forwarding routes for each additional network packet), scheduling-based techniques (e.g., selecting forwarding routes for each additional network packet in round-robin fashion), or deterministic techniques (e.g., applying a hash function to data in the additional network packets to identify a forwarding route corresponding to a generated hash value, such as described above with respect to FIGS. 5 and 6) may be implemented to load balance generated network packets. Once the forwarding decisions for the additional network packets are determined, then the additional network packets may be forwarded by the packet processor via different possible forwarding routes according to the forwarding decisions, as indicated at 740.

As packet processors may also implement load-balancing and/or other forwarding decision determination mechanisms that are tailored to the requirements of processing received network packets, in some embodiments it may be more efficient to implement different components for determining forwarding decisions for network packets generated by the packet processor. FIG. 8 is a high-level flowchart illustrating various methods and techniques to process mirrored packets and sampled packets via a separate destination resolution pipeline, according to some embodiments. As indicated at 810, a network packet may be received at a packet processor for processing and processed via a destination resolution pipeline to determine a forwarding decision for the network packet.

Additionally, the received network packet may be the basis for generating a network packet at the packet processor. For example, as indicated at the network packet may be evaluated to determine whether the network packet is to be identified for mirroring, as indicated at 830. Different stages, such as an MIMS stage, L2 stage, L3 stage, access control list stage or the destination resolution pipeline may indicate that the network packet should be mirrored. If so, as indicated by the positive exit from 830, then a forwarding decision for a mirrored version of the network packet may be determined via a separate destination resolution pipeline, as indicated at 850, such as processor-generated destination resolution pipeline 440 discussed above with regard to FIGS. 4-6. In this way, load balancing may be applied to the mirrored version of the network packet that sends the mirrored version along a different forwarding route than the original network packet, alleviating the stress of mirroring on the network connection that sends the original network packet. As indicated at 860, then the mirrored version of the network packet may be forwarded according to the determined forwarding decision.

In some embodiments, the received network packet may also be sampled, as indicated at 832. The network packet may also be evaluated to determine whether the network packet is to be identified for sampling. For instance, a statistics collection stage may randomly or periodically choose network packets for sampling and may mark or otherwise indicate sampling for the network packet when processing the received network packet. In at least some embodiments, a sampled network packet is not forwarded in its entirety but instead a portion of information (e.g., various packet header fields or information) may be stored or buffered as part of a sample network packet, as indicated at 842. In this way, the information of multiple network packets being sampled may be aggregated before sending.

As indicated by the positive exit from 852, once the sample network packet is ready to send, then a forwarding decision for the sample network packet may be determined via the separate destination resolution pipeline, as indicated at 850. As indicated at 860, then the sample network packet may be forwarded according to the determined forwarding decision.

In addition to generating network packets based on individual received network packets, aggregate statistics, diagnostics, and/or other information may be collected about the traffic or the packet processor and generated as network packets to be sent to a remote system or device for analysis. FIG. 9 is a high-level flowchart illustrating various methods and techniques to process statistic packets via a separate destination resolution pipeline, according to some embodiments. As indicated at 910, network packets may be received at a packet processor, for processing. An analysis of the network packets may be performed to determine, for example, to detect and measure flow cache entries for large traffic flows and determine the number of unique traffic flows. The numbers generated by the analysis may be collected and stored over time. Periodically (or in response to some other kind of trigger to send the collected information, such as indication that a buffer or other storage mechanism is full), statistics packets including the information may be generated, as indicated at 920.

Similar to the discussion above with regard to FIG. 8, a separate destination resolution pipeline may be utilized to determine forwarding decisions for the statistics packets which may load balance the forwarding of the statistics packets amongst possible forwarding routes. Once the forwarding decisions are made, then as indicated at 940, the statistics packet(s) may be forwarded according to the forwarding decision(s).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A networking device, comprising:
a plurality of physical network interfaces; and
a packet processor, comprising a destination resolution pipeline for processing received network packets and a different destination resolution pipeline for processing generated network packets;
wherein the packet processor is configured to:
receive different network packets via the physical network interfaces from different sources;
process, by the destination resolution pipeline, the different network packets to determine respective forwarding decisions for the different network packets;
based on the different network packets, generate a plurality of additional network packets that originate from the packet processor instead of being received via the physical network interfaces;
process, by the different destination resolution pipeline, the additional network packets to determine respective forwarding decisions for the additional network packets; and
forward the different network packets and the additional network packets via the physical network interfaces according to the respective forwarding decisions.

2. The networking device of claim 1, wherein to process the additional network packets via the different destination resolution pipeline, the packet processor is configured to apply a load balancing scheme amongst a plurality of possible forwarding routes from the network packet processor to determine the respective forwarding decisions for the additional network packets.

3. The networking device of claim 2, wherein to apply the load balancing scheme, the packet processor is configured to:
for individual ones of the additional network packets:
identifying a group of elements in a group table for a destination resolution stage of the different destination resolution pipeline according to a pointer obtained at a prior stage of the packet processor for the additional network packet;
select one element of the group of elements according to a hash value generated for the additional network packet and the destination resolution stage; and
read an entry in a pointer table for the destination resolution stage mapped to the selected element, wherein the respective forwarding decision for the additional network packet is based on the entry read from the pointer table.

4. The networking device of claim 1, wherein the additional network packets comprise:
a mirrored version of one of the different network packets received at the packet processor;
a sampled version of one of the different network packets received at the packet processor; or
a network statistics packet based on an analysis of the different network packets received at the packet processor that is performed by the packet processor.

5. A method, comprising:
generating, by a packet processor, a plurality of network packets that originate from the packet processor instead of being received at the packet processor, wherein the plurality of network packets are generated in addition to different network packets received via respective network connections from different sources at the packet processor for processing;
determining, by the packet processor, respective forwarding decisions for the plurality of network packets according to a load balancing scheme amongst a plurality of possible forwarding routes from the packet processor; and
forwarding, by the packet processor, the plurality of network packets via different ones of the possible forwarding routes according to the respective forwarding decisions.

6. The method of claim 5,
wherein the method further comprises identifying, by the packet processor, one of the different network packets for mirroring; and
wherein generating the plurality of network packets comprises generating a mirrored version of the identified network packet.

7. The method of claim 6,
wherein the method further comprises identifying, by the packet processor, another one of the different network packets for mirroring, wherein the other network packet is received as part of a same traffic flow as the one network packet identified for mirroring;
wherein generating the plurality of network packets comprises generating a mirrored version of the identified other network packet; and
wherein the mirrored version of the other network packet is forwarded via one of the possible forwarding routes that is different than the mirrored version of the one network packet.

8. The method of claim 5,
wherein the method further comprises analyzing, by the packet processor, the different network packets received at the packet processor for processing; and
wherein generating the plurality of network packets comprises generating one or more network statistic packets based on the analysis of the different network packets.

9. The method of claim 5, wherein determining respective forwarding decisions for the plurality of network packets according to the load balancing scheme comprises:
applying a hash function to respective data in the plurality of network packets to generate respective hash values; and
selecting the different ones of the possible forwarding routes as the respective forwarding decisions based on the respective hash values for the plurality of network packets.

10. The method of claim 9, further comprising modifying the respective data of one of the plurality of network packets prior to applying the hash function.

11. The method of claim 5,
wherein the method further comprises processing the different network packets received at the packet processor via a destination resolution pipeline; and
wherein determining the respective forwarding decisions for the plurality of network packets comprises processing the plurality of network packets via a different destination resolution pipeline than the destination resolution pipeline.

12. The method of claim 5, wherein processing the plurality of network packets via the different destination resolution pipeline comprises:
for individual ones of the plurality of network packets:
identifying a group of elements in a group table for a destination resolution stage of the different destination resolution pipeline according to a pointer obtained at a prior stage of the packet processor for the network packet;
selecting one element of the group of elements according to a hash value generated for the network packet and the destination resolution stage; and
reading an entry in a pointer table for the destination resolution stage mapped to the selected element, wherein the respective forwarding decision for the network packet is based on the entry read from the pointer table.

13. The method of claim 12, further comprising:
for one of the individual network packets:
identifying a group of elements in another group table for a different destination resolution stage of the different destination resolution pipeline according to another pointer;
selecting one element of the group of elements in the other group table according to another hash value generated for the one network packet and the other destination resolution stage; and
reading an entry in another pointer table for the other destination resolution stage mapped to the selected element, wherein the respective forwarding decision for the one network packet is based on the entry read from the other pointer table.

14. A system, comprising:
a device configured to perform packet processing, the device comprising;
a plurality of network interfaces configured to transmit and receive packets via a network connection to the device; and
a packet processing pipeline that processes different network packets received from different sources via the network interfaces and forwards the different network packets according to forwarding decisions determined for the different network packets by the packet processing pipeline, wherein the packet processing pipeline is configured to:
generate a plurality of network packets that originate from the device instead of being received at the device via the plurality of network interfaces in addition to the different network packets;
apply a load balancing scheme amongst a plurality of possible forwarding routes via the network interfaces from the device to determine respective forwarding decisions for the generated network packets; and
send the generated network packets via different ones of the possible forwarding routes according to the respective forwarding decisions.

15. The system of claim 14,
wherein the packet processing pipeline is further configured to identify one of the different network packets for mirroring; and
wherein to generate the plurality of network packets, the packet processing pipeline is configured to generate a mirrored version of the identified network packet.

16. The system of claim 14,
wherein the packet processing pipeline is further configured to identify one of the different network packets for sampling; and
wherein to generate the plurality of network packets, the packet processing pipeline is configured to include a sampled version of the identified network packet in a sample network packet.

17. The system of claim 14, wherein to apply the load balancing scheme amongst the plurality of possible forwarding routes, the packet processing pipeline is configured to:
generate respective hash values according to a hash function applied to respective data in the plurality of network packets; and
select the different ones of the possible forwarding routes as the respective forwarding decisions based on the respective hash values for the plurality of network packets.

18. The system of claim 14,
wherein the forwarding decisions determined for the different network packets received by the packet processing pipeline are determined by one or more destination resolution stages of the packet processing pipeline; and
wherein to apply the load balancing scheme to determine the respective forwarding decisions for the plurality of network packets, the packet processing pipeline is configured to process the plurality of network packets via one or more different destination resolution stages than the one or more destination resolution stages.

19. The system of claim 18, wherein to process the plurality of network packets via the one or more different destination resolution stages, the packet processing pipeline is configured to:
for individual ones of the plurality of network packets:
identify a group of elements in a group table for one of the one or more different destination resolution stages according to a pointer obtained at a prior stage of the packet processing pipeline for the network packet;
select one element of the group of elements according to a hash value generated for the network packet and the one destination resolution stage; and
read an entry in a pointer table for the one destination resolution stage mapped to the selected element, wherein the respective forwarding decision for the network packet is based on the entry read from the pointer table.

20. The system of claim 14, wherein the device is an application specific integrated circuit (ASIC), a system-on-chip (SoC), or a field-programmable gate array (FPGA).

* * * * *